United States Patent
Pan et al.

(10) Patent No.: US 11,418,553 B2
(45) Date of Patent: Aug. 16, 2022

(54) VIDEO CONNECTION METHOD AND APPARATUS, AND NON-TRANSITORY COMPUTER-READABLE STORAGE MEDIUM

(71) Applicant: BEIJING DAJIA INTERNET INFORMATION TECHNOLOGY CO., LTD., Beijing (CN)

(72) Inventors: Pengfei Pan, Beijing (CN); Shuifeng Lin, Beijing (CN); Haizhao Xu, Beijing (CN); Meikai Qu, Beijing (CN); Zechen Zhou, Beijing (CN); Miao Liu, Beijing (CN); Xiaofei Wang, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/388,989

(22) Filed: Jul. 29, 2021

(65) Prior Publication Data

US 2022/0166811 A1     May 26, 2022

(30) Foreign Application Priority Data

Nov. 25, 2020   (CN) .................... 202011344410.X (51) Int. Cl.
   *H04L 65/403*      (2022.01)
   *H04L 12/18*       (2006.01)
   *H04L 65/1069*    (2022.01)

(52) U.S. Cl.
   CPC ........ *H04L 65/403* (2013.01); *H04L 12/1818* (2013.01); *H04L 12/1831* (2013.01); *H04L 65/1069* (2013.01)

(58) Field of Classification Search
   CPC ............... H04L 65/403; H04L 65/1069; H04L 12/1818; H04L 12/1831
   See application file for complete search history.

(56) References Cited

U.S. PATENT DOCUMENTS

| 7,920,158 | B1 | 4/2011 | Beck et al. |
| 8,375,421 | B1 * | 2/2013 | Shigapov ................ H04L 63/10 |
| | | | 726/4 |

(Continued)

FOREIGN PATENT DOCUMENTS

| CN | 101848226 A | 9/2010 |
| CN | 103237018 A | 8/2013 |

(Continued)

OTHER PUBLICATIONS

European Patent Office, Search Report for EP application 21188294.9, dated Dec. 14, 2021.

(Continued)

*Primary Examiner* — Kristie D Shingles (74) *Attorney, Agent, or Firm* — Timothy W. Menasco, Esq.; Harter Secrest & Emery LLP (57) ABSTRACT

The present disclosure relates to a video connection method and apparatus. The method includes: obtaining matched video connection requests from a plurality of video connection requests; creating a video connection room for the matched video connection requests; generating identification information of the video connection room; and informing a first client and a second client of entering the video connection room and making a video connection by sending the identification information of the video connection room to the first client and the second client corresponding to the matched video connection requests respectively.

16 Claims, 6 Drawing Sheets

(56) References Cited

U.S. PATENT DOCUMENTS

| | | | |
|---|---|---|---|
| 9,185,184 B2* | 11/2015 | Bustamente | G06Q 10/1095 |
| 10,904,296 B1* | 1/2021 | Mathew | H04L 65/605 |
| 2005/0058088 A1* | 3/2005 | Decker | H04M 7/006 |
| | | | 370/260 |
| 2007/0040889 A1* | 2/2007 | Sahashi | G06Q 30/02 |
| | | | 348/14.01 |
| 2013/0263227 A1* | 10/2013 | Gongaware | H04L 63/08 |
| | | | 726/4 |
| 2014/0229866 A1* | 8/2014 | Gottlieb | G06Q 10/10 |
| | | | 709/204 |
| 2016/0112364 A1 | 4/2016 | Gelyana et al. | |
| 2018/0152665 A1 | 5/2018 | Zuo et al. | |
| 2020/0203024 A1* | 6/2020 | Hunter | G06F 21/602 |
| 2021/0297461 A1* | 9/2021 | Athwal | G06Q 10/0838 |

FOREIGN PATENT DOCUMENTS

| | | |
|---|---|---|
| CN | 107509114 A | 12/2017 |
| CN | 109275039 A | 1/2019 |
| CN | 110188123 A | 8/2019 |
| CN | 111729319 A | 10/2020 |
| CN | 111901618 A | 11/2020 |
| EP | 3825929 A2 | 5/2021 |
| WO | 2012116197 A2 | 8/2012 |

OTHER PUBLICATIONS

The State Intellectual Property Office of People's Republic of China, First Office Action for CN application 202011344410.X with English translation.

Zhang, Exclusive | beta "connection" function, Tik Tok explores real-time video socialization, Apr. 7, 2020.

* cited by examiner

VIDEO CONNECTION METHOD AND APPARATUS, AND NON-TRANSITORY COMPUTER-READABLE STORAGE MEDIUM

CROSS-REFERENCE TO RELATED APPLICATION

The present application is based upon and claims priority to Chinese Patent Application No. 202011344410.X, filed on Nov. 25, 2020, the entirety contents of which are incorporated herein by reference.

FIELD

The present disclosure relates to the field of video socialization, and in particular, to a video connection method and apparatus, and a non-transitory computer-readable storage medium.

BACKGROUND

Video socialization is a brand-new way of socializing after the development of community socialization. It is different from traditional social methods that only use text and pictures as a carrier. Video socialization is a brand-new communication method using online video as a carrier and online community communication as a means of expression. Video socialization includes multiple types such as live broadcasts, group chats, short videos, random matching and acquaintance communication tools. In related technologies, in addition to communicating with acquaintances, video social networking has greater randomness. Users can randomly click into the live broadcast room of the host or chat with strangers through random matching.

SUMMARY

The present disclosure provides a video connection method and apparatus, and a non-transitory computer-readable storage medium. The technical solutions of the disclosure are described as follows.

Embodiments of the disclosure provide a video connection method, including: obtaining matched video connection requests from a plurality of video connection requests; creating a video connection room for the matched video connection requests; generating identification information of the video connection room; and informing a first client and a second client of entering the video connection room and making a video connection by sending the identification information of the video connection room to the first client and the second client corresponding to the matched video connection requests respectively.

Embodiments of the present disclosure provide a video connection apparatus, including: one or more processors; a memory storing instructions executable by the one or more processors; in which the one or more processors are configured to execute the instructions to: obtain matched video connection requests from a plurality of video connection requests; create a video connection room for the matched video connection requests; generate identification information of the video connection room; and inform a first client and a second client of entering the video connection room and making a video connection by sending the identification information of the video connection room to the first client and the second client corresponding to the matched video connection requests respectively.

Embodiments of the present disclosure provide a non-transitory computer-readable storage medium, in which when an instruction stored therein is executed by a processor, the processor is caused to perform a video connection method, and the method includes: obtaining matched video connection requests from a plurality of video connection requests; creating a video connection room for the matched video connection requests; generating identification information of the video connection room; and informing a first client and a second client of entering the video connection room and making a video connection by sending the identification information of the video connection room to the first client and the second client corresponding to the matched video connection requests respectively.

It should be understood that the above general description and the following detailed description are only exemplary and explanatory, and cannot limit the disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure, and do not constitute an improper limitation of the present disclosure.

DETAILED DESCRIPTION

In order to enable those skilled in the art to understand the technical solutions of the present disclosure, reference will be made clearly and completely technical solutions in the embodiments of the present disclosure with accompanying drawings.

It should be noted that terms "first" and "second" in the specification and claims of the present disclosure and the accompanying drawings are used to distinguish similar objects, rather than to describe a specific order or sequence. It should be understood that data used in such a manner may be interchanged under appropriate circumstances so that embodiments of the present disclosure described herein may be implemented in a sequence other than the sequence illustrated or described herein. The implementations described in the following exemplary embodiments do not represent all implementations consistent with the present disclosure; instead, the implementations described in the following exemplary embodiments are merely examples of an apparatus and method consistent with the attached claims and some aspects of the present disclosure.

Figure 1:
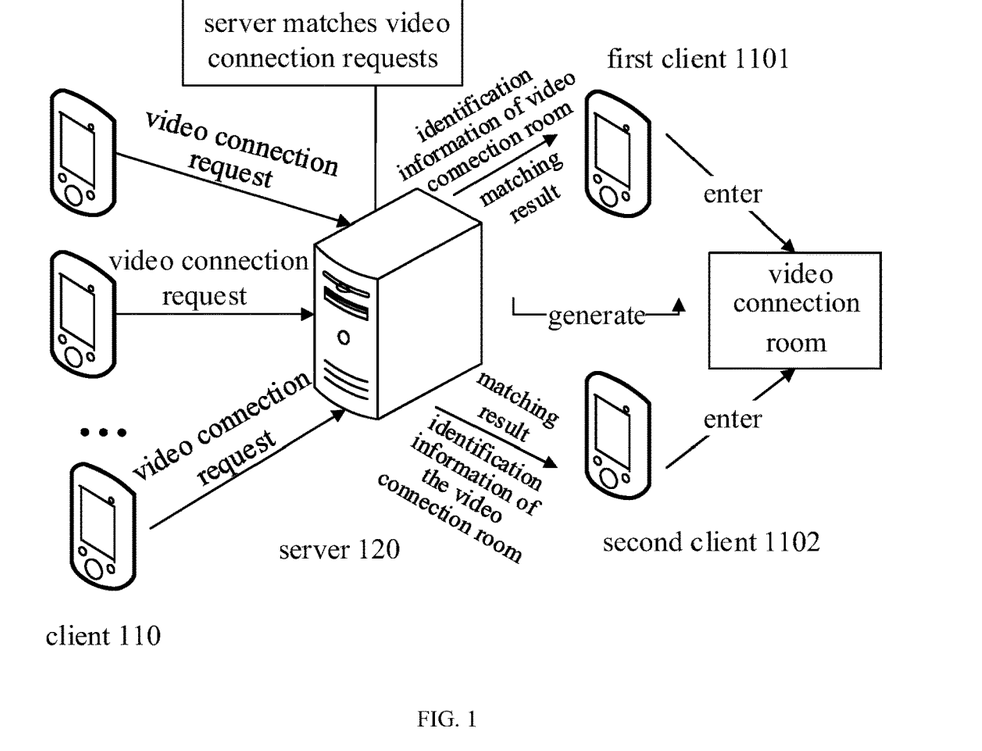
FIG. 1 is a schematic diagram showing an application scenario of a video connection method according to an exemplary embodiment.

FIG. 1 is a schematic diagram showing an application scenario of a video connection method according to an exemplary embodiment of the present disclosure. The application scenario includes a client 110 and a server 120. Each client 110 sends a video connection request to the server, and the server 120 temporarily stores the video connection request corresponding to each client 110 in a video connection request set, and obtains the video connection request from the video connection request set for matching, so as to obtain matched video connection requests. The server 120 determines the first client 1101 and the second client 1102 corresponding to the matched video connection requests according to the video connection requests that match with each other. The server 120 establishes a video connection room, and sends the identification information of the video connection room to the first client 1101 and the second client 1102 respectively, so that the first client 1101 and the second client 1102 enter the video connection room and make a video connection.

In the embodiments of the present disclosure, the client 110, the first client 1101, and the second client 1102 may include physical devices such as smart phones, desktop computers, tablet computers, notebook computers, digital assistants, smart wearable devices, etc. It can also include software running on physical devices, such as applications. The operating system running on the physical device in the embodiments of the present application may include, but is not limited to, Android system, IOS system, Linux, Unix, windows, etc. The client 110, the first client 1101, and the second client 1102 include a UI (User Interface) layer. The client 110, the first client 1101 and the second client 1102 provide external display of published content as well as the collection of log data through the UI layer, and send the data required for data analysis is sent to the server 120 based on API (Application Programming Interface).

In the embodiment of the present disclosure, the server 120 may include an independently running server, or a distributed server, or a server cluster composed of multiple servers. The server 120 may include a network communication unit, a processor, a memory, and so on. Specifically, the server 120 may be used to obtain the video connection request of each client 110 for matching, to determine the first client 1101 and the second client 1102, or to determine more groups of clients corresponding to mutually matched video connection requests in one match. The server 120 creates a video connection room and sends the identification information of the video connection room to the corresponding first client 1101 and the second client 1102, so that the first client 1101 and the second client 1102 could make a video connection.

Figure 2:
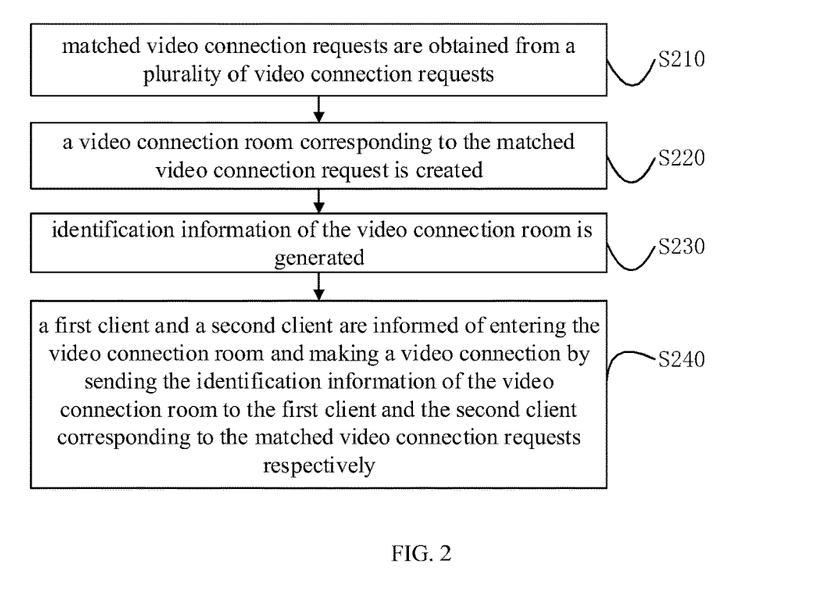
FIG. 2 is a flowchart showing a video connection method according to an exemplary embodiment.

FIG. 2 is a flowchart showing a video connection method according to an exemplary embodiment. The method includes followings.

At S210, matched video connection requests are obtained from a plurality of video connection requests.

In detail, video connection requests stored in a video connection request set are obtained for pairwise matching, thereby obtaining video connection requests that match each other.

Figure 3:
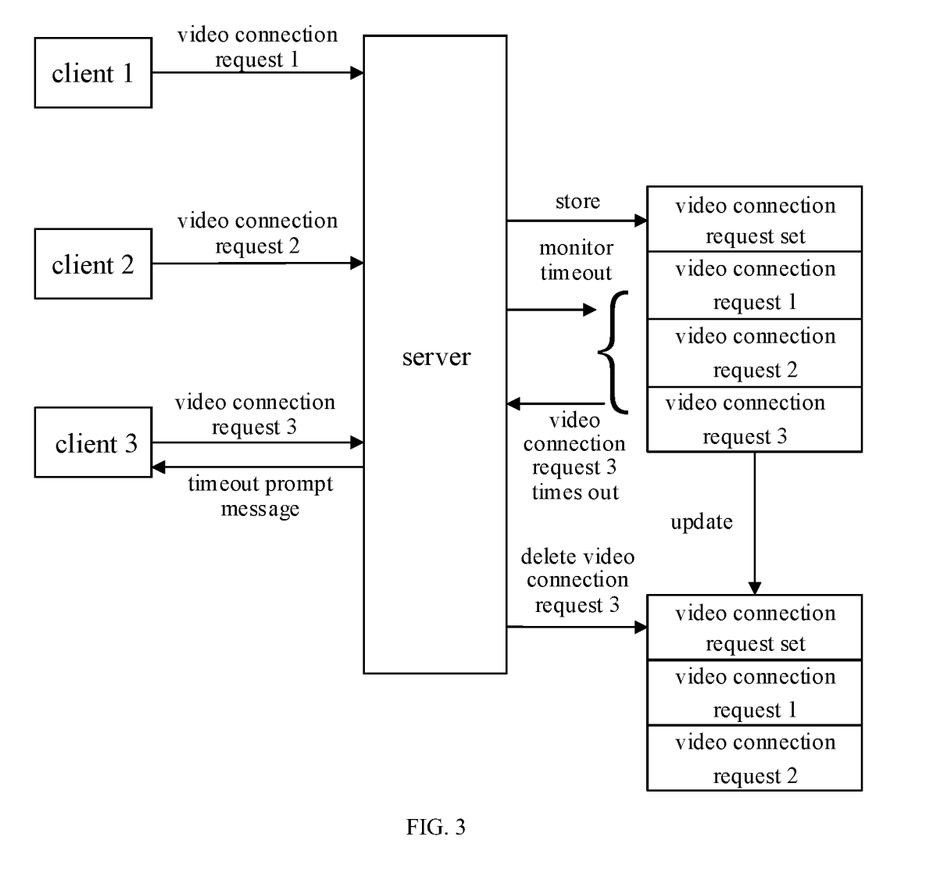
FIG. 3 is a schematic diagram showing a video connection request in a video connection method according to an exemplary embodiment.

As an embodiment, referring to FIG. 3, before obtaining the matched video connection requests from the plurality of video connection requests, the method also includes followings.

At S310, a video connection request sent by at least one client is received.

At S320, the video connection request is stored in the video connection request set.

At S330, matching waiting times of video connection requests in the video connection request set are monitored.

At S340, a request timeout prompt message is sent to a client with a video connection request of which a matching waiting time is greater than or equal to a preset matching waiting time threshold.

At S350, the video connection request of which the matching waiting time is greater than or equal to the preset matching waiting time threshold is removed from the video connection request set.

As an embodiment, the video connection request set may be a preset video connection request matching pool, and the video connection requests are stored in the video connection request matching pool. The server can match the video connection request by means of a shuttle bus system, and use the arrival time of the shuttle bus as the time for the video connection matching to match the stored video connection request. At the time for the video connection matching, the server obtains the video connection request from the video connection request matching pool for matching. At the time for the video connection matching, the video connection request matching pool is emptied to wait for storing video connection requests received before the time for the video connection matching. For example, a shuttle bus is arrived every 5 seconds, if the start time is 0, the shuttle bus arrives at the fifth second. At the fifth second, all video connection requests stored in the video connection request matching pool are obtained, and these video connection requests are matched. At this time, the video connection request matching pool is emptied, and when a new video connection request is received at the 6th second, the new video connection request is stored in the video connection request matching pool.

The video connection request matching pool is used as the video connection request set. After the video connection request pool is emptied, new information can be stored. The video connection request matching pool may be reused, and there is no need to frequently create containers for storing video connection requests, thereby simplifying the process.

As an embodiment, a matching waiting time threshold is set in the server, and the video connection request of the client may be a video connection request not exceeding the preset matching waiting time threshold. When the server receives a new video connection request and temporarily stores the video connection request in the video connection request matching pool, the time period that the video connection request is stored in the video connection request matching pool is obtained as a matching waiting time. For example, a video connection request waits 3 seconds to reach the preset matching time after entering the video connection request matching pool, and if the matching is successful, then the total matching waiting time of the video connection request is 3 seconds. When the matching waiting time exceeds the preset matching waiting time threshold, the video connection request corresponding to the matching waiting time in the video connection request matching pool is emptied. For example, the preset time is 60 seconds, a video connection request waits for 5 seconds to reach the preset matching time after entering the video connection request matching pool, but the matching is failed, then the video connection request is entered to the matching pool again and matched for 11 times. Thus, the total matching waiting time is 60 seconds. The server determines that matching waiting time of the video connection request has exceeded the preset matching waiting time threshold, thus deleting the video connection request from the video connection request matching pool. When the server deleting the video connection request, a request timeout prompt message may be sent to the client corresponding to the video connection request at the same time. When the video connection request temporarily stored in the video connection request matching pool is matched at the preset matching time, other video connection requests that are not successfully matched will be put into the video connection request matching pool again to continue recording the matching waiting time until the video connection request is matched successfully or the matching times out.

The video connection request with the waiting time that exceeds the waiting time threshold is deleted according to the matching waiting time of the video connection request, thereby avoiding wasting the storage capacity of the video connection request matching pool and the user's time, and improving the efficiency of matching the video connection request.

Figure 4:
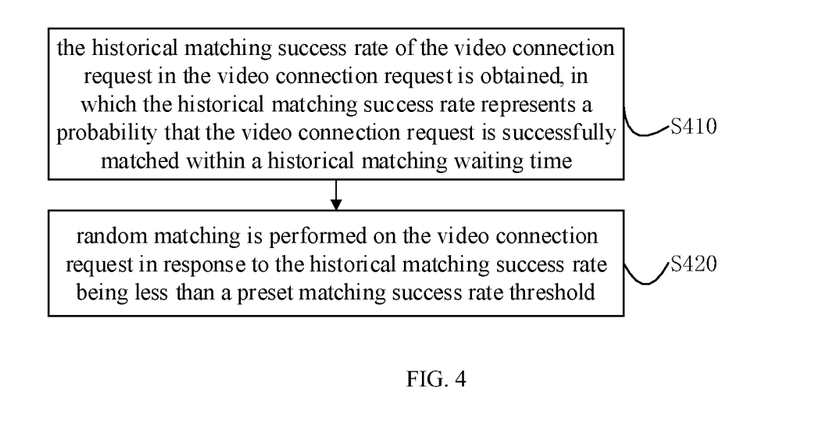
FIG. 4 is a flowchart of random matching in a video connection method according to an exemplary embodiment.

As an embodiment, referring to FIG. 4, after the video connection requests are stored in the video connection request set, the method further includes followings.

At S410, the historical matching success rate of the video connection request in the video connection request is obtained. The historical matching success rate represents a probability that the video connection request is successfully matched within a historical matching waiting time.

At S420, random matching is performed on the video connection request in response to the historical matching success rate being less than a preset matching success rate threshold.

Specifically, the matching waiting time of each video connection request stored in the video connection request matching pool is obtained, and the numbers of times of each video connection request matching with or not matching with another video connection within at least one matching waiting time before each previous matching are respectively counted. According to the number of matched and unmatched times, the historical matching success rate of each video connection request within the historical matching waiting time is calculated. At least one period of time before matching the video connection request each time is the historical matching waiting time. During matching, the historical matching success rate of each video connection request in the matching pool within the historical matching waiting time may be obtained. If it is determined that the historical matching success rate of a certain video connection request is lower than a preset success rate matching threshold, the video connection request corresponding to the historical matching success rate is randomly matched.

When calculating the historical matching success rate, the average matching waiting time of the video connection request is used as a reference to distinguish each video connection request as easy to match or not easy to match, and the random matching can also be performed on video connection requests that are not easy to match.

The random matching may avoid a situation where another video connection request cannot be matched all the time, which can improve the user experience and make the video connection request more intelligent.

Figure 5:
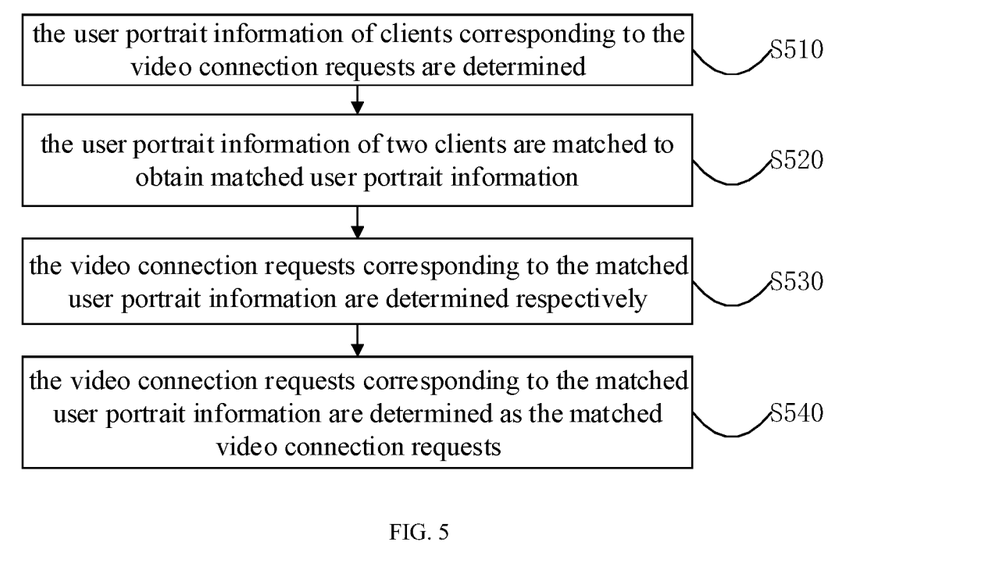
FIG. 5 is a schematic diagram showing a video connection request matching in a video connection method according to an exemplary embodiment.

As an embodiment, referring to FIG. 5, obtaining the matched video connection requests from the plurality of video connection requests includes followings.

At S510, the user portrait information of clients corresponding to the video connection requests are determined.

At S520, the user portrait information of two clients are matched to obtain matched user portrait information.

At S530, the video connection requests corresponding to the matched user portrait information are determined respectively.

At S540, the video connection requests corresponding to the matched user portrait information are determined as the matched video connection requests.

Specifically, the server can use a shuttle bus system to perform matching with a preset interval. For example, the matching may be performed every 5 seconds, and the time after the preset interval has elapsed is the preset matching time, and the matching starts and all the video connection requests temporarily stored in the matching pool are obtained at this time. The user portrait information of the client such as age, city, gender, etc. can be determined according to the client corresponding the video connection request. After calculating the matching degree of any two user portrait information based on a preset matching algorithm, at least one group of two user portrait information whose matching degree reaches a valid matching value is obtained, thereby determining that the video connection requests corresponding to the at least one group of two user portrait information are the matched video connection requests.

The server may also filter the user portrait information before starting the matching according to the preset matching condition. In a specific embodiment, the preset matching condition can be set as: obtaining the user portrait information in the same city. The portrait information is filtered before the matching started by determining whether the user portrait information indicates the same city, and then the filtered user portrait information is matched to determine the matched user portrait information.

Determining the matched video connection requests by matching the user portrait information may improve the adaptability between clients on a video connection in the same video connection room, thereby improving the accuracy of the video connection request matching.

Figure 6:
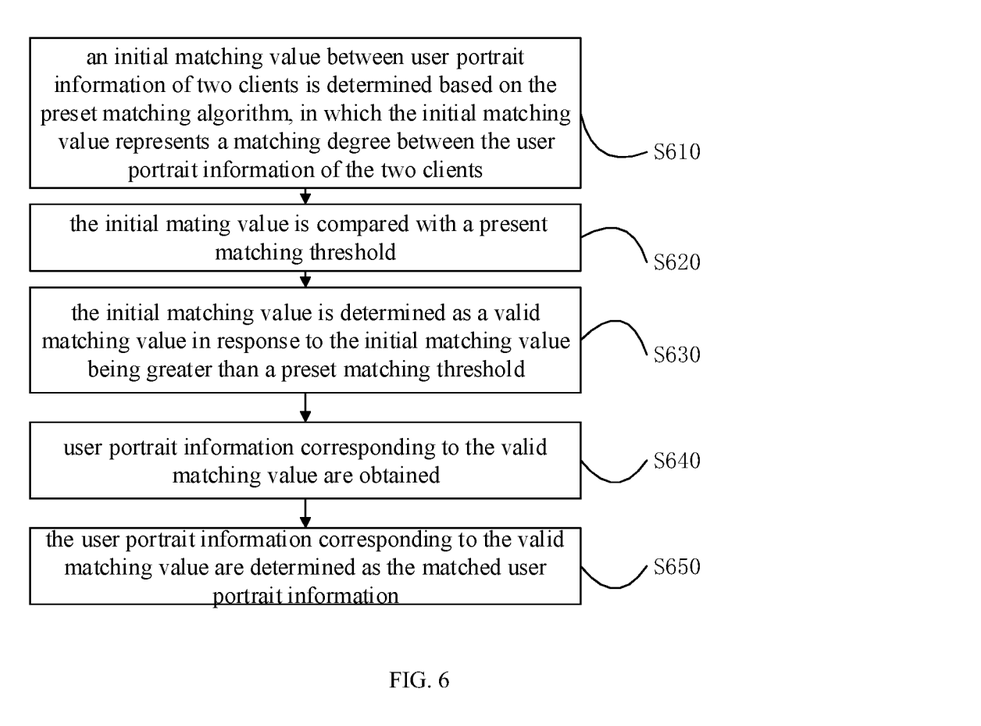
FIG. 6 is a flowchart showing matching process of user portraits in a video connection method according to an exemplary embodiment.

As an embodiment, referring to FIG. 6, matching the user portrait information of every two clients to obtain at least one group of matched user portrait information includes followings.

At S610, an initial matching value between user portrait information of two clients is determined based on the preset matching algorithm, in which the initial matching value represents a matching degree between the user portrait information of the two clients.

At S620, the initial mating value is compared with a present matching threshold.

At S630, the initial matching value is determined as a valid matching value in response to the initial matching value being greater than a preset matching threshold.

At S640, user portrait information corresponding to the valid matching value are obtained.

At S650, the user portrait information corresponding to the valid matching value are determined as the matched user portrait information.

As an embodiment, the server determines the initial matching value between two user portrait information according to a preset matching algorithm, and the initial matching value represents a difference between any two user portrait information among all user portrait information currently being matched. For example, there are user portrait information of users A, B, and C, the portrait information of user A is living in city M, hobbies of photography and age 25, and the portrait information of user B is living in city M, hobbies of painting and age 28, the portrait information of user C is living in city N, hobbies of photography and age 40. When matching the user portrait information, the initial matching value between the user portrait information of user A and the user portrait information of user B is 0.66, which means that 66% of content in the user portrait information of the user A and B are matched. The initial matching value between the user portrait information of user A and the user portrait information of user C is 0.34, which means that 34% of content in the user portrait information of the user A and C are matched. The initial matching value between the user portrait information of user B and the user portrait information of user C can be 0, which means that the user portrait information of the user B and C are completely mismatched.

A preset matching threshold is set in the server. The initial matching value greater than the matching threshold is used as a valid matching value, and the initial matching value smaller than the matching threshold is used as an invalid matching value. The initial matching values are filtered according to the preset matching threshold to obtain at least one valid matching value among the initial match values.

When there is only one valid matching value, it means that there is only one group of matched user portrait information at this time. When there are two or more valid matching values, if there is no overlap between the two user portrait information corresponding to the valid matching values, the user portrait information corresponding to all valid matching values are determined as the matched user portrait information. In addition, after the two user portrait information corresponding to the valid matching values are determined as the matched user portrait information, the video connection requests corresponding to other user portrait information may be re-added to the matching pool, and other user portrait information includes user portrait information other than the matched user portrait information. That is, after the match is performed, video connection requests except for the video connection requests that match each other will be put back into the matching pool and wait for the next matching. When the next preset matching time comes, other video connection requests that were unsuccessful in the previous matching will be matched with the newly added video connection request.

The two pieces of user portrait information corresponding to the two user portrait information of the valid matching value are determined as the matched user portrait information. As an embodiment, five user portrait information A, B, C, D, and E are matched at the current preset matching time. If the initial matching value between the user portrait information A and the user portrait information B, the initial matching value between the user portrait information C and user portrait information D are valid matching values, and other initial matching values are invalid matching values, then user portrait information A and user portrait information B are regarded as the matched user portrait information, the user portrait information C and the user portrait information D are also regarded as the matched user portrait information, and the video connection request corresponding to the user portrait information E is put back to the matching pool to wait for the next matching.

As an embodiment, the server can perform matching sequentially through multiple tag information in the user portrait information by using a matching algorithm. The server arranges the tag information in sequence according to the priority of the matching order. The server first obtains the tag information with the highest priority in the matching order in the two user portrait information, such as the tag information of city. If the tag information of city indicates the same city, the matching degree of the two user portrait information is counted as 1. If the tag information of city indicates different cities, the matching degree of the two user portrait information is counted as 0. Then the server obtains the tag information with the second priority in the matching order in the two user portrait information, such as age information. If the age information indicates that the ages are within a preset difference and are adults, the matching degree of two user portrait information is counted as 1. If the age information indicates that the ages are not within the preset difference or one of them is a minor, the matching degree of the two user portrait information is counted as 0. The above steps are repeated until all the tag information is matched, and a set of matching degree series consisting of 0 and 1 is obtained. The matching degree series is converted into a value according to the preset calculation method, thus obtaining the initial matching value of the two user portrait information.

As an embodiment, the matching algorithm exhausts all combinations of user portrait information, that is, any two user portrait information in the user portrait information currently being matched need to be matched once, and the initial matching value between any two user portrait information. Any user portrait information can be selected from the user portrait information to be matched, and the initial matching value of the user portrait information and other user portrait information can be calculated. Then the user portrait information is deleted from the user portrait information to be matched, any user portrait information is selected from the updated user portrait information to be matched, the initial matching values of the user portrait information and other user portrait information may be calculated. The above steps are repeated until only two user portrait information are left for matching in the last user portrait information to be matched.

By setting the matching threshold, it is possible to prevent video connection requests with a low matching degree from being determined as matched video connection requests, thereby improving the effectiveness of video connection request matching.

Figure 7:
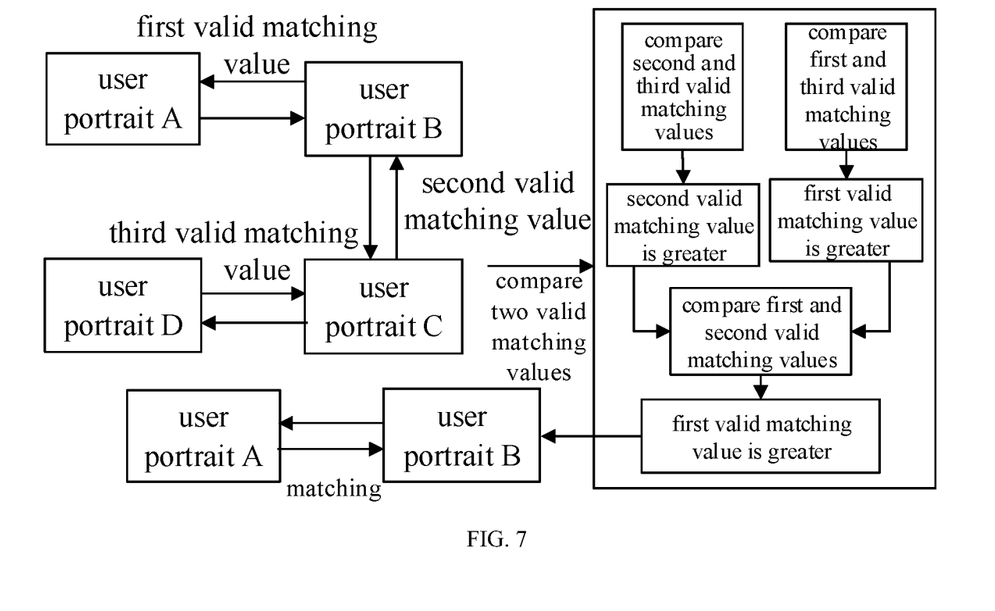
FIG. 7 is a flowchart of determining a target valid matching value during matching in a video connection method according to an exemplary embodiment.

As an embodiment, after determining that the initial matching value greater than the preset matching threshold as a valid matching value, the method further includes followings.

At S710, in a case that there are two valid matching values and user portrait information corresponding to the two valid matching values overlap, the two valid matching values are compared.

At S720, the greater valid matching value among the two valid matching values of which the user portrait information overlap is determined as a target valid matching value.

At S730, the two user portrait information corresponding to the target valid matching value are obtained.

At S740, the two user portrait information corresponding to the target valid matching value are determined as the matched user portrait information.

As an embodiment, if there are at least two valid matching values, and there is overlap between the user portrait information corresponding to any two valid matching values, then the two valid matching values of which the user portrait information are overlapped are compared to obtain the greater valid matching value among the valid matching values, the greater valid matching value is determined as the target valid matching value, and the two user portrait information corresponding to the target valid matching value are determined as the matching user portrait information.

In the case of multiple valid matching values of which user portrait information are overlapped, please refer to FIG. 7, the valid matching value of user portrait information A and user portrait information B is the first valid matching value, the valid matching value of user portrait information B and user portrait information C is the second valid matching value, and the valid matching value of the user portrait information C and the user portrait information D is the third valid matching value. At this time, these valid matching values are still divided into groups, each group includes two values, and the greater valid matching value is selected as the target valid match value. For example, the first valid matching value and the third valid matching value are compared, and it is determined that the first valid matching value of the two valid matching values is greater. The second valid matching value and the third valid matching value are compared, and it is determined that the second valid matching value of the two valid matching values is greater. Therefore, the first valid matching value and the second valid matching value are compared again. When the first valid matching value is greater than the second valid matching value, the first valid matching value is selected as the target valid matching value, that is, the user portrait A and the user portrait B are determined as the group of matched user portrait information.

As an embodiment, if there are other valid matching values in addition to the two valid matching values of which the pieces of user portrait information are overlapped, the matched pieces of user portrait information also include two user portrait information corresponding to the other valid matching values.

If there are five user portrait information A, B, C, D, and E, the valid matching value of user portrait information A and user portrait information B is the first valid matching value, and the valid matching value of user portrait information B and user portrait information C is the second valid matching value, the valid matching value of the user portrait information D and the user portrait information E is the third valid matching value, and the other initial matching values are all invalid matching values, then the first valid matching value and the second valid matching value are compared and the first valid matching value is determined as the greater one, then the user portrait information A and the user portrait information B are determined as the matched user portrait information, and the user portrait information D and the user portrait information E are determined as the matched user portrait information. The video connection request corresponding to the user portrait information C is put back to the matching pool, and wait for the next matching.

In the case of multiple valid matching values for the same video connection request, each two valid matching values are compared, the greater valid matching values are selected for comparison until the target valid matching value is obtained, which can improve accuracy and effectiveness of the video connection matching, thereby improving the user experience.

At S220, a video connection room corresponding to the matched video connection request is created.

At S230, identification information of the video connection room is generated.

At S240, a first client and a second client are informed of entering the video connection room and making a video connection by sending the identification information of the video connection room to the first client and the second client corresponding to the matched video connection requests respectively.

That is, the identification information of the video connection room is respectively sent to clients corresponding to the matched video connection requests corresponding to the video connection room, so that the corresponding clients perform a video connection according to the identification information of the video connection room.

As an embodiment, after a match, there may be no matched video connection requests, or there may be a group of matched video connection requests, or there may be multiple groups of matched video connection requests. When there is no matched video connection request, the server puts the matched video connection request this time back into the matching pool for the next matching. When there is only one group of matched video connection requests, the server creates a video connection room corresponding to the group of matched video connection requests, and generates identification information of the video connection room. The server respectively sends the identification information of the video connection room to the two clients corresponding to this group of matched video connection requests, so that the client enters the video connection room according to the identification information of the video connection room to perform the video connection with the other client that has received the identification information of the video connection room.

When there are multiple groups of matched video connection requests, the server creates a video connection room for each group of the matched video connection requests, and the number of groups of matched video connection requests is the same as the number of video connection rooms. The server generates the identification information of each video connection room, and respectively sends the identification information of each video connection room to the two clients corresponding to the group of the matched video connection request corresponding to the video connection room, so that the client enters the video connection room based on the identification information and performs the video connection with the other client that has received the identification information of the same video connection room.

For each group of video connection requests, a corresponding video connection room is created, which improves the privacy of video socialization, thereby enriching the video social scene on the basis of ensuring user privacy.

Figure 8:
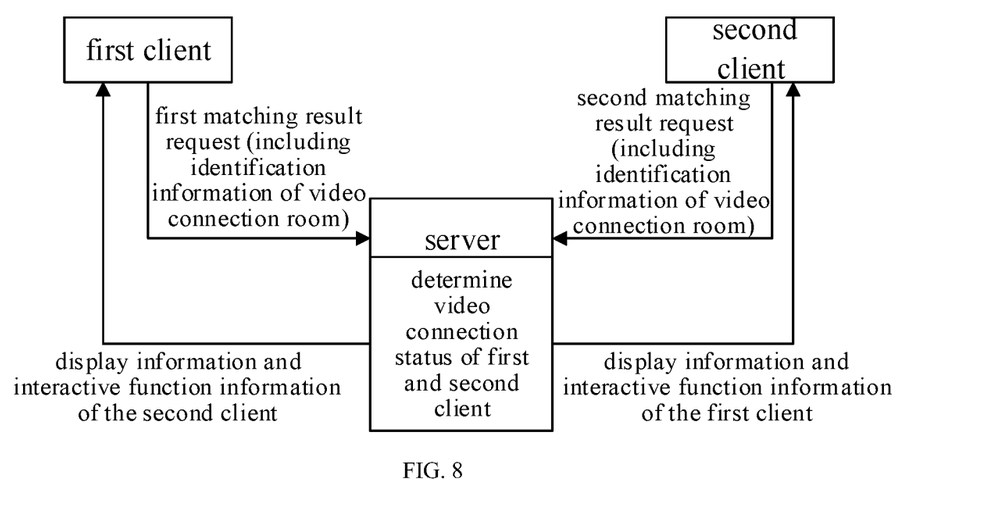
FIG. 8 is a flowchart of a client obtaining public information of another client in a video connection method according to an exemplary embodiment.

As an embodiment, the clients corresponding to the matched video connection requests are the first client and the second client, and the method further includes followings.

At S810, a first matching result request including the identification information of the video connection room the first client entered periodically sent by the first client is received during the video connection between the first client and the second client.

At S820, a video connection status of the first client is determined according to the first matching result request.

At S830, display information and interactive function information of the second client which is in the same video connection room as the first client are determined according to the identification information of the video connection room in response to determining that the video connection status of the first client is online.

At S840, the display information and interactive function information of the second client are sent to the first client.

As an embodiment, please refer to FIG. 8. The server sends the identification information of the video connection room to clients corresponding to the matched video connection requests respectively through a persistent connection, and the corresponding client enters the video connection room created by the server to start the video connection. When the first client and the second client are on the video connection, both the first client and the second client can maintain the state of the video connection by polling.

The first client sends a first matching result request to the server. The first matching result request includes the identification information of the video connection room where the first client is located. The server determines the video connection status of the first client according to the first matching result request of the first client. When the first client continues to send the first matching result request, the server may determine that the first client is currently online. When the first client terminal interrupts sending the first matching result request, and the interrupted time lasts for a preset time, the server can determine that the first client is currently disconnected, or when the first client terminal interrupts sending the first matching result request, the server sends to the first client a status inquiry message asking whether the first client is online. If the first client does not answer the status inquiry message, the server can determine that the first client is currently disconnected, and if the client answers the status inquiry message, the server can determine that the first client is still online. Similarly, the server can accept a second matching result request sent by the second client. The second matching result request includes the identification information of the video connection room where the second client is located. The server determines the current video connection status of the second client by using the method of determining the current video connection status of the first client.

When the current video connection status of the first client is online, the display information and interactive function information of the second client in the same video connection room as the first client are determined according to the identification information of the video connection room where the first client is located. The display information and interactive function information are information that can be disclosed by the second client, such as name information, avatar information, and interactive games. The server sends the display information and interactive function information of the second client to the first client. Similarly, when the current video connection status of the second client is online, the server determines the display information and interactive function information of the first client in the same video connection room as the second client according to the identification information of the video connection room where the second client is located. The display information and interactive function information are information that can be disclosed by the first client, such as name information, avatar information, interactive games, and music. The server sends the display information and interactive function information of the first client to the second client. When the current video connection status of the first client and the second client are both online, the first client and the second client can connect and interact in the video connection room. When the first client is online but the second client is offline, or the first client is offline but the second client is online, the currently online client can display the display information and interactive function information of the currently offline client, but cannot interact with the offline client.

As an embodiment, the display information and interactive function information of different clients can be set according to user requirements. For example, when the user sets not to display interactive music and only displays interactive games, the interactive function information includes only interactive games.

During the video connection, the client can only obtain the public information of the other party without the consent of the other client, which improves the privacy of video socialization and also allows users to have entertainment activities in a private video socialization, thereby improving the user experience.

Figure 9:
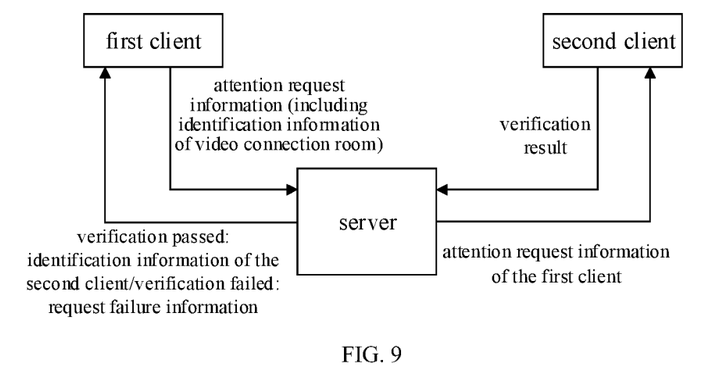
FIG. 9 is a flowchart of a client obtaining private information of another client in a video connection method according to an exemplary embodiment.

As an embodiment, the clients corresponding to the matched video connection requests are the first client and the second client, and the method further includes followings.

At S910, an attention request information for the second client sent by the first client is received in response to the video connection between the first client and the second client ending, in which the attention request information includes the identification information of the video connection room where the first client locates.

At S920, the second client in the same video connection room as the first client is determined according to the identification information of the video connection room where the first client locates.

At S930, the attention request information is sent to the second client.

At S940, a verification result sent by the second client is obtained.

At S950, the identification information of the second client is sent to the first client in a case that the verification result passes.

Specifically, the identification information of the second client is private information. Only after the video connection ends or during the video connection, the first client sends the attention request information to the server to request to obtain the identification information of the second client in the same video connection room, and the server forwards the attention request message to the second client and after the second client passes the verification, the first client may obtain the identification information of the second client. Before the video connection is made, the first client cannot obtain the identification information of the second client.

As an embodiment, referring to FIG. 9, after the video connection ends, the server may receive the attention request information sent by the first client, and the attention request information may include the identification information of the video connection room. The server can determine the second client in the same video connection room as the first client according to the identification information of the video connection room, thereby determining the object to which the first client requests to follow.

The server forwards the attention request information of the first client to the second client. After verifying the attention request information, the second client sends the verification result to the server. If the second client passes the verification of the attention request information, the server forwards the identification information of the second client to the first client. If the second client fails the verification of the attention request information, the server sends request failure information to the first client.

During the video connection or after the video connection ends, the client can obtain the private information of the other party with the consent of another client, which improves the privacy of video socialization, thereby enriching the video social scenes and ensuring user privacy at the same time.

Figure 10:
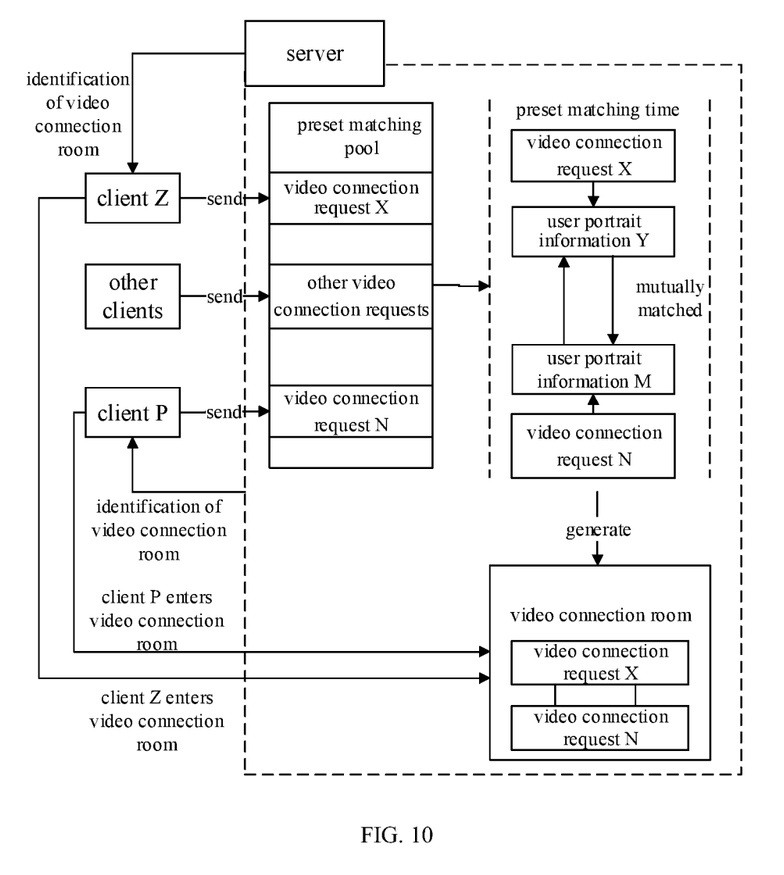
FIG. 10 is a flowchart of a client obtaining private information of another client in a video connection method according to an exemplary embodiment.

The video connection method proposed in the present disclosure can be applied to the application scenario of video socialization, please refer to FIG. 10. In a specific embodiment, the client Z sends a video connection request X to the server, and the server temporarily stores this video connection request X in a preset video connection request matching pool and marks it as a video connection request. The preset matching pool also stores video connection requests for which the last match was failed, and video connection requests newly added between the last preset matching time and the next preset matching time other than the video connection request X. At the preset matching time, the server obtains the video connection request in the preset matching pool for matching.

The server obtains the user portrait information Y of the client corresponding to the video connection request X, calculates a similarity between the user portrait information Y and the user portrait information corresponding to other video connection requests, and obtains at least one initial matching value regarding the user portrait information Y The server compares at least one initial matching value regarding the user portrait information Y with a preset matching threshold, and obtains an initial matching value regarding the user portrait information Y that is greater than the matching threshold, that is, the valid matching value regarding the user portrait information Y If there is only one valid matching value for the user portrait information Y at this time, and the corresponding user portrait information are Y and M, then the user portrait information Y and the user portrait information M are the matched user portrait information, and the video connection request N and the video connection request X corresponding to the user portrait information M are the matched video connection requests. If there are at least two valid matching values for the user portrait information Y at this time, the greater valid matching value of any two valid matching values is obtained as the target valid matching value. This process can be performed more than once until two user portrait information corresponding to the target valid matching value are obtained and determined as the matched user portrait information.

The server creates a video connection room corresponding to the video connection request N and the video connection request X, and generates identification information of the video connection room. The server respectively sends the identification information of the video connection room to the client P and the client Z corresponding to the video connection requests N and X. The client P and the client Z enter the video connection room and start the video connection according to the identification information of the video connection room. At this time, the client P and the client Z can obtain public information of each other, such as an avatar or an interactive game, through the server. After the video connection ends or during the video connection, the client P may send the attention request information to the server, and the identification information of the video connection room is added to the attention request information of the video connection room where the client Z performs the video connection. After the server determines the client Z according to the identification information of the video connection room, the server forwards the attention request information to the client Z, and forwards the verification result of the client Z to the client P.

The present disclosure proposes a video connection method. The method includes: at a preset matching moment, a server obtains a video connection request in a preset matching pool, and matches pairwise video connection requests to obtain at least one group of matched video connection requests. The server creates a video connection room, and only sends the identification information of the video connection room to the two clients corresponding to the matched video connection requests corresponding to the video connection room. The corresponding two clients performs the video connection based on the identification information of the video connection room. During the video connection, the two corresponding clients can obtain each other's public information through the server. During the video connection or after the video connection ends, either of the two clients can send the attention request information to the server, and the information is then forwarded to the other client to obtain the private information of the other client.

By matching the video connection requests, this method enables the client to make a video connection in a one-to-one video connection scene, and the client can only obtain the public information of the other party by default during the video connection, and the private information of the other party is obtained only when the attention is requested, thereby improving the privacy and adaptability of video socialization, and enriching the video social scene while better protecting user privacy. The method can also match video connection requests according to user portrait information, set a matching threshold, and determine a valid matching value according to the matching threshold, thereby improving the effectiveness and accuracy of video connection matching and improving user experience.

Figure 11:
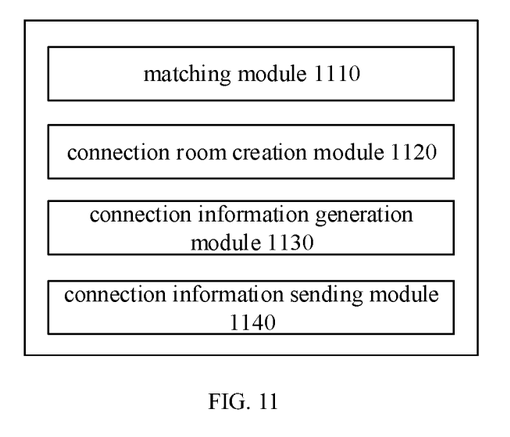
FIG. 11 is a flowchart of a client obtaining private information of another client in a video connection method according to an exemplary embodiment.

FIG. 11 shows a video connection apparatus according to an exemplary embodiment of the present disclosure. The apparatus includes a matching module 1110, a connection room creation module 1120, a connection information generation module 1130, and a connection information sending module 1140.

The matching module 1110 is configured to obtain matched video connection requests from a plurality of video connection requests.

In detail, video connection requests stored in a video connection request set are obtained for pairwise matching, thereby obtaining video connection requests that match each other.

The connection room creation module 1120 is configured to create a video connection room corresponding to the matched video connection request.

The connection information generation module 1130 is configured to generate identification information of the video connection room.

The connection information sending module 1140 is configured to respectively send the identification information of the video connection room to the clients corresponding to corresponding to the matched video connection requests corresponding to the video connection room, so that the corresponding clients perform a video connection according to the identification information of the video connection room.

As an embodiment, the clients corresponding to the matched video connection requests are a first client and a second client, and the apparatus further includes: an attention request receiving module, configured to receive the attention request information sent by the first client to the second client after the video connection between the first client and the second client ends, in which the attention request information comprises the identification information of the video connection room; a second client determination module, configured to determine the second client in the same video connection room as the first client according to the identification information of the video connection room where the first client locates; an attention request sending module, configured to execute sending the attention request information to the second client; a verification result obtaining module, configured to obtain a verification result sent by the second client; an identification information sending module, configured to send the identification information of the second client to the first client in case that the verification result is passed.

As an embodiment, the clients corresponding to the matched video connection requests are the first client and the second client, and the apparatus further includes: a first matching result request receiving module, configured to periodically receive the first matching result request including the identification information of the video connection room the first client entered sent by the first client during the video connection between the first client and the second client; a connection status determination module, configured to determine a video connection status of the first client according to the first matching result request; a public information determining module, configured to determine display information and interactive function information of the second client which is in the same video connection room as the first client according to the identification information of the video connection room in response to determining that the video connection status of the first client is online; a public information sending module, configured to send the display information and interactive function information of the second client to the first client.

As an embodiment, the matching module 1110 includes: a user portrait determining unit, configured to determine the user portrait information of the client corresponding to the video connection request; a user portrait matching unit, configured to match the user portrait information of the two clients to obtain the matched user portrait information; a connection request matching result determining unit, configured to determine the video connection requests corresponding to the matched user portrait information respectively; and determine the video connection requests corresponding to the matched user portrait information as the matched video connection request.

As an embodiment, the user portrait matching unit includes: an initial matching value determining unit, configured to determine an initial matching value between user portrait information of two clients based on the preset matching algorithm, in which the initial matching value represents a matching degree between the user portrait information of the two clients; a comparison unit, configured to perform a comparison between the initial matching value and the preset matching threshold; a valid matching value determining unit, configured to determine an initial matching value greater than the preset matching threshold as a valid matching value; a user portrait matching result obtaining unit, configured to obtain user portrait information corresponding to the valid matching value; and determine the user portrait information corresponding to the valid matching value as the matched user portrait information.

As an embodiment, the user portrait matching unit further includes: an overlapping information comparison unit, configured to compare, in a case that there are two valid matching values and user portrait information corresponding to the two valid matching values overlap, the two valid matching values; determine the greater valid matching value among the two valid matching values of which the user portrait information overlap as a target valid matching value; obtain the two user portrait information corresponding to the target valid matching value; and determine the two user portrait information corresponding to the target valid matching value as the matched user portrait information.

As an embodiment, the apparatus further includes: a connection request receiving module, configured to receive a video connection request sent by at least one client; a connection request storage module, configured to store the video connection request to the video connection request set; a monitoring module, configured to monitor matching waiting times of video connection requests in the video connection request set; a timeout prompt module, configured to send a request timeout prompt message to a client with a video connection request of which a matching waiting time is greater than or equal to a preset matching waiting time threshold; a connection request deletion module, configured to remove the video connection request of which the matching waiting time is greater than or equal to the preset matching waiting time threshold from the video connection request set.

As an embodiment, the apparatus further includes: a success rate obtaining unit, configured to obtain the historical matching success rate of the video connection request in the video connection request, in which the historical matching success rate represents a probability that the video connection request is successfully matched within a historical matching waiting time; a random matching unit, configured to perform random matching on the video connection request in response to the a historical matching success rate being less than a preset matching success rate threshold.

As an embodiment, the video connection request set is a preset video connection request matching pool.

The specific manner for each module in the apparatus described in the above embodiments performing the operations has been described in detail in the method embodiments and detailed description will not be given here.

Figure 12:
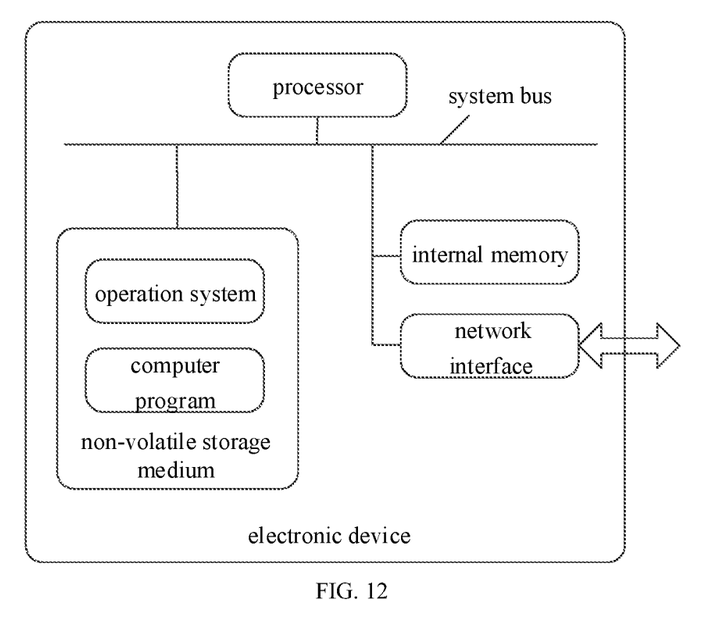
FIG. 12 is a block diagram showing an electronic device for video connection when the electronic device is a terminal according to an exemplary embodiment.

FIG. 12 is a block diagram showing an electronic device for video connection when the electronic device is a terminal according to an exemplary embodiment. The electronic device may be a server, and its internal structure diagram may be as shown in FIG. 12. The electronic device includes a processor, a memory, and a network interface connected through a system bus. The processor of the electronic device is used to provide calculation and control capabilities. The memory of the electronic device includes a non-volatile storage medium and an internal memory. The non-volatile storage medium stores an operating system and a computer program. The internal memory provides an environment for the operation of the operating system and computer programs in the non-volatile storage medium. The network interface of the electronic device is used to communicate with an external terminal through a network connection. The computer program is executed by the processor to realize a video connection method.

Those skilled in the art can understand that the structure shown in FIG. 12 is only a block diagram of part of the structure related to the solution of the present disclosure, and does not constitute a limitation on the electronic device to which the solution of the present disclosure is applied. The specific electronic device may include more or less parts than shown in the figure, or combining some parts, or having a different arrangement of parts.

In an exemplary embodiment, an electronic device is also provided, and the electronic device includes: a processor; a memory used to store executable instructions of the processor, where the processor is configured to execute instructions to implement the above-mentioned video connection method.

In an exemplary embodiment, a computer-readable storage medium is also provided. When the instructions in the storage medium are executed by the processor of the electronic device, the electronic device can execute the above-mentioned video connection method.

In an exemplary embodiment, a computer program product is also provided. The computer program product is stored in a storage medium, so that a processor of an electronic device can read the computer program product from the storage medium and execute the above-mentioned video connection method.

Those skilled in the art can understand that all or part of the processes in the above-mentioned embodiment methods can be implemented by instructing relevant hardware through a computer program. The computer program can be stored in a non-volatile computer readable storage medium. When the computer program is executed, it may include the procedures of the above-mentioned method embodiments. Any reference to memory, storage, database or other media used in the embodiments provided in this application may include non-volatile and/or volatile memory. Non-volatile memory may include read only memory (ROM), programmable ROM (PROM), electrically programmable ROM (EPROM), electrically erasable programmable ROM (EEPROM), or flash memory. Volatile memory may include random access memory (RAM) or external cache memory. As an illustration and not a limitation, RAM is available in many forms, such as static RAM (SRAM), dynamic RAM (DRAM), synchronous DRAM (SDRAM), double data rate SDRAM (DDRSDRAM), enhanced SDRAM (ESDRAM), synchronous chain Channel (Synchlink) DRAM (SLDRAM), memory bus (Rambus) direct RAM (RDRAM), direct memory bus dynamic RAM (DRDRAM), and memory bus dynamic RAM (RDRAM), etc.

Those skilled in the art will easily achieve other embodiments of the disclosure after considering the description and practicing the invention disclosed herein. The disclosure is intended to cover any variations, uses, or adaptive changes of the disclosure. These variations, uses, or adaptive changes follow the general principles of the disclosure and include common knowledge or conventional technical means in the technical field not disclosed in the disclosure. The description and the embodiments are only regarded as exemplary, and the true scope and spirit of the disclosure are pointed out by the following claims.

It should be understood that the disclosure is not limited to the precise structure that has been described above and shown in the drawings, and various modifications and changes can be made without departing from its scope. The scope of the disclosure is only limited by the appended claims.

What is claimed is:

1. A video connection method, applied to a server, comprising:
receiving a plurality of video connection requests from a plurality of clients;
obtaining a first video connection request matching a second video connection request by performing matching on the plurality of video connection requests;
creating a video connection room for the first video connection request and the second video connection request;
generating identification information of the video connection room; and
informing a first client corresponding to the first video connection request and a second client corresponding to the second video connection request of entering the video connection room and making a video connection by sending the identification information of the video connection room to the first client and the second client corresponding to the matched video connection requests respectively,
wherein obtaining the first video connection request matching the second video connection request comprises:
determining user portrait information of clients corresponding to the plurality of video connection requests;
obtaining first user portrait information of the first client corresponding to the first video connection request matching second user portrait information of the second client corresponding to the second video connection request based on a preset matching algorithm; and
determining video connection requests corresponding to the first user portrait information and the second user portrait information as the first video connection request and the second video connection request, and
wherein obtaining first user portrait information of the first client corresponding to the first video connection request matching second user portrait information of the second client corresponding to the second video connection request based on a preset matching algorithm comprises:
determining an initial matching value between user portrait information of two clients based on the preset matching algorithm, the initial matching value representing a matching degree between the user portrait information of the two clients;
determining the initial matching value as a valid matching value in response to the initial matching value being greater than a preset matching threshold; and
determining user portrait information corresponding to the valid matching value as the first user portrait information and the second user portrait information.

2. The method of claim 1, further comprising:
receiving an attention request information for the second client sent by the first client in response to the video connection ending, wherein the attention request information comprises the identification information of the video connection room;
sending the attention request information to the second client;
obtaining a verification result sent by the second client; and
sending identification information of the second client to the first client in a case that the verification result passes.

3. The method of claim 1, further comprising:
receiving, during the video connection, a first matching result request comprising the identification information of the video connection room periodically sent by the first client;
determining a video connection status of the first client according to the first matching result request;

determining display information and interactive function information of the second client according to the identification information of the video connection room in response to determining that the video connection status of the first client is online; and sending the display information and the interactive function information of the second client to the first client.

4. The method of claim 1, further comprising:

comparing two valid matching values in a case that user portrait information corresponding to the two valid matching values overlap;

determining a greater one of the valid matching values as a target valid matching value; and determining user portrait information corresponding to the target valid matching value as the first user portrait information and the second user portrait information.

5. The method of claim 1, further comprising:

storing the plurality of video connection requests in a video connection request set;

monitoring matching waiting times of the video connection requests in the video connection request set;

sending a request timeout prompt message to a client with a video connection request of which a matching waiting time is greater than or equal to a preset matching waiting time threshold; and removing the video connection request of which the matching waiting time is greater than or equal to the preset matching waiting time threshold from the video connection request set.

6. The method of claim 5, further comprising:

obtaining a historical matching success rate of a video connection request in the video connection request set, wherein the historical matching success rate represents a probability that the video connection request is successfully matched within a historical matching waiting time; and performing random matching on the video connection request in response to the historical matching success rate being less than a preset matching success rate threshold.

7. The method of claim 5, wherein the video connection request set comprises a preset video connection request matching pool.

8. The method of claim 1, wherein sending the identification information of the video connection room to the first client and the second client comprises:

sending the identification information of the video connection room to the first client and the second client via a persistent connection.

9. A video connection apparatus, applied to a server, comprising:

one or more processors;

a memory storing instructions executable by the one or more processors;

wherein the one or more processors are configured to execute the instructions to:

receive a plurality of video connection requests from a plurality of clients;

obtain a first video connection request matching a second video connection request by performing matching on the plurality of video connection requests;

create a video connection room for the first video connection request and the second video connection request;

generate identification information of the video connection room; and inform a first client corresponding to the first video connection request and a second client corresponding to the second video connection request of entering the video connection room and making a video connection by sending the identification information of the video connection room to the first client and the second client;

determine user portrait information of clients corresponding to the plurality of video connection requests;

obtain first user portrait information of the first client corresponding to the first video connection request matching second user portrait information of the second client corresponding to the second video connection request based on a preset matching algorithm;

determine video connection requests corresponding to the first user portrait information and the second user portrait information as the first video connection request and the second video connection request;

determine an initial matching value between user portrait information of two clients based on the preset matching algorithm, the initial matching value representing a matching degree between the user portrait information of the two clients;

determine the initial matching value as a valid matching value in response to the initial matching value being greater than a preset matching threshold; and determine user portrait information corresponding to the valid matching value as the first user portrait information and the second user portrait information.

10. The apparatus of claim 9, wherein the one or more processors are configured to execute the instructions to:

receive an attention request information for the second client sent by the first client in response to the video connection ending, wherein the attention request information comprises the identification information of the video connection room;

send the attention request information to the second client;

obtain a verification result sent by the second client; and send identification information of the second client to the first client in a case that the verification result passes.

11. The apparatus of claim 9, wherein the one or more processors are configured to execute the instructions to:

receive, during the video connection, a first matching result request comprising the identification information of the video connection room periodically sent by the first client;

determine a video connection status of the first client according to the first matching result request;

determine display information and interactive function information of the second client according to the identification information of the video connection room in response to determining that the video connection status of the first client is online; and send the display information and the interactive function information of the second client to the first client.

12. The apparatus of claim 9, wherein the one or more processors are configured to execute the instructions to:

compare two valid matching values in a case that user portrait information corresponding to the two valid matching values overlap;

determine a greater one of the valid matching values as a target valid matching value; and determine user portrait information corresponding to the target valid matching value as the first user portrait information and the second user portrait information.

13. The apparatus of claim 9, wherein the one or more processors are configured to execute the instructions to:
store the plurality of video connection requests in a video connection request set;
monitor matching waiting times of the video connection requests in the video connection request set;
send a request timeout prompt message to a client with a video connection request of which a matching waiting time is greater than or equal to a preset matching waiting time threshold; and
remove the video connection request of which the matching waiting time is greater than or equal to the preset matching waiting time threshold from the video connection request set.

14. The apparatus of claim 13, wherein the one or more processors are configured to execute the instructions to:
obtain a historical matching success rate of a video connection request in the video connection request set, wherein the historical matching success rate represents a probability that the video connection request is successfully matched within a historical matching waiting time; and
perform random matching on the video connection request in response to the historical matching success rate being less than a preset matching success rate threshold.

15. The apparatus of claim 9, wherein the one or more processors are configured to execute the instructions to:
send the identification information of the video connection room to the first client and the second client via a persistent connection.

16. A non-transitory computer-readable storage medium, wherein when an instruction stored therein is executed by a processor, the processor is caused to perform a video connection method, the method is applied to a server and comprises:
receiving a plurality of video connection requests from a plurality of clients;
obtaining a first video connection request matching a second video connection request by performing matching on the plurality of video connection requests;
creating a video connection room for the first video connection request and the second video connection request;
generating identification information of the video connection room; and
informing a first client corresponding to the first video connection request and a second client corresponding to the second video connection request of entering the video connection room and making a video connection by sending the identification information of the video connection room to the first client and the second client;
determining user portrait information of clients corresponding to the plurality of video connection requests;
obtaining first user portrait information of the first client corresponding to the first video connection request matching second user portrait information of the second client corresponding to the second video connection request based on a preset matching algorithm;
determining video connection requests corresponding to the first user portrait information and the second user portrait information as the first video connection request and the second video connection request;
determining an initial matching value between user portrait information of two clients based on the preset matching algorithm, the initial matching value representing a matching degree between the user portrait information of the two clients;
determining the initial matching value as a valid matching value in response to the initial matching value being greater than a preset matching threshold; and
determining user portrait information corresponding to the valid matching value as the first user portrait information and the second user portrait information.

* * * * *